(12) United States Patent
Yasui

(10) Patent No.: US 11,168,716 B2
(45) Date of Patent: Nov. 9, 2021

(54) LINEAR ACTUATOR

(71) Applicant: NABTESCO CORPORATION, Tokyo (JP)

(72) Inventor: Tsutomu Yasui, Tokyo (JP)

(73) Assignee: NABTESCO CORPORATION, Tokyo (JP)

(*) Notice: Subject to any disclaimer, the term of this patent is extended or adjusted under 35 U.S.C. 154(b) by 0 days.

(21) Appl. No.: 17/010,457

(22) Filed: Sep. 2, 2020

(65) Prior Publication Data
US 2021/0079938 A1  Mar. 18, 2021

(30) Foreign Application Priority Data
Sep. 17, 2019  (JP) ................ JP2019-168655

(51) Int. Cl.
*F15B 15/28* (2006.01)
*F15B 13/044* (2006.01)

(52) U.S. Cl.
CPC ...... *F15B 15/2838* (2013.01); *F15B 13/0444* (2013.01); *F15B 2211/20515* (2013.01); *F15B 2211/7051* (2013.01); *F15B 2211/765* (2013.01)

(58) Field of Classification Search
CPC .............. F15B 15/2815; F15B 15/2823
See application file for complete search history.

(56) References Cited

U.S. PATENT DOCUMENTS

| | | | | |
|---|---|---|---|---|
| 4,381,507 A * | 4/1983 | Parmer | .............. | F15B 15/2823 340/686.1 |
| 4,386,552 A * | 6/1983 | Foxwell | .............. | F15B 15/2823 91/1 |
| 4,552,055 A * | 11/1985 | Foxwell | .............. | F15B 15/2823 91/1 |
| 4,582,183 A * | 4/1986 | Kuroda | ................. | B60T 17/22 192/143 |
| 4,700,610 A * | 10/1987 | Bauer | .................. | F15B 9/03 73/9 |
| 6,928,894 B2 * | 8/2005 | Falcou | ................ | F15B 15/088 160/188 |

(Continued)

FOREIGN PATENT DOCUMENTS

| | | |
|---|---|---|
| DE | 102014225658 A1 | 6/2016 |
| JP | 2007-064481 A | 3/2007 |

OTHER PUBLICATIONS

Extended European Search Report dated Jan. 27, 2021, issued in corresponding European Patent Application No. 20194227.3 (8 pgs.).

*Primary Examiner* — Thomas E Lazo
(74) *Attorney, Agent, or Firm* — Pillsbury Winthrop Shaw Pittman, LLP

(57) ABSTRACT

One object is to calculate the position of a rod of a linear actuator with a high precision. The linear actuator includes a rod capable of moving in an axial direction relative to a housing. The rod is moved by rotation of an output shaft of a motor. A position sensor for sensing the relative position of the rod relative to a preset reference position is provided in the housing. A rotation sensor for sensing the rotation angle of the output shaft of the motor is provided in the vicinity of the motor. The linear actuator includes a position calculating unit for calculating the position of the rod based on a position sensing value of the position sensor and a rotation angle sensing value of the rotation sensor.

8 Claims, 5 Drawing Sheets

(56) References Cited

U.S. PATENT DOCUMENTS

| | | | |
|---|---|---|---|
| 9,341,266 B1 * | 5/2016 | Vivatson | F15B 15/2823 |
| 9,356,486 B2 * | 5/2016 | Kopecek | H02K 7/06 |
| 9,568,029 B2 * | 2/2017 | Lemke | F15B 15/26 |
| 2002/0050756 A1 * | 5/2002 | Ito | H02K 11/225 |
| | | | 310/135 |
| 2007/0044461 A1 | 3/2007 | Burdick et al. | |
| 2015/0061471 A1 | 3/2015 | Kopecek | |
| 2019/0257638 A1 | 8/2019 | Roberts et al. | |

* cited by examiner

LINEAR ACTUATOR

CROSS-REFERENCE TO RELATED APPLICATIONS

This application is based on and claims the benefit of priority from Japanese Patent Application Serial No. 2019-168655 (filed on Sep. 17, 2019), the contents of which are hereby incorporated by reference in their entirety.

TECHNICAL FIELD

The present invention relates to a linear actuator, a rod position calculating method, a non-transitory computer-readable storage medium storing position calculating program, and a position calculating device.

BACKGROUND

The linear actuator disclosed in Japanese Patent Application Publication No. 2007-064481 ("the '481 Publication") includes a housing having a circular shape. The opposite end portions of the housing are covered by closing walls, and the housing defines a space therein. The housing contains a piston shaped like a disc. The piston is moved in the axial direction of the housing by the pressure of a fluid introduced into the inner space of the housing. A rod is provided, with one end portion thereof fixed to the piston. The rod penetrates the closing wall, such that the other end portion of the rod is outside the housing. In addition, the linear actuator of the '481 Publication includes a position sensor for sensing the position of the other end portion of the rod. The position sensor outputs voltages in accordance with the relative position of the rod relative to a reference position.

In the linear actuator of the '481 Publication, the position sensor needs to have a larger sensing field as the stroke range of the rod is larger. With the larger sensing field, the sensing precision of the position sensor tends to be lower as compared to those of position sensors having a smaller sensing field for fixed reference voltages, because the position sensor outputs a voltage in accordance with the relative position of the rod relative to the reference position. Therefore, for the linear actuator as disclosed in the '481 Publication, there is a demand for a technique of sensing with a high precision the position of the rod having a large stroke range.

SUMMARY

The present invention addresses such circumstances, and one object thereof is to calculate the position of the rod with a high precision.

A linear actuator for achieving the above object includes: a rod capable of moving in an axial direction; a motor for moving the rod; at least one position sensor for sensing a relative position of the rod relative to a preset reference position; at least one rotation sensor for sensing a rotation angle of the motor; and a position calculating unit for calculating a position of the rod based on a position sensing value of the at least one position sensor and a rotation angle sensing value of the at least one rotation sensor.

A rod position calculating method for achieving the above object includes: a relative position sensing step of sensing, by a position sensor, a position of a rod capable of moving in an axial direction, the position being sensed as a relative position relative to a preset reference position; a rotation angle sensing step of sensing, by a rotation sensor, a rotation angle of a motor for moving the rod; and a position calculating step of calculating, by a position calculating device having obtained a position sensing value of the position sensor and a rotation angle sensing value of the rotation sensor, a position of the rod of a linear actuator based on the position sensing value and the rotation angle sensing value.

A position calculating program for achieving the above object causes a computer to perform: a relative position obtaining process of obtaining a sensing value of a position sensor for sensing a position of a rod capable of moving in an axial direction, the position being sensed as a relative position relative to a preset reference position; a rotation angle obtaining process of obtaining a sensing value from a rotation sensor for sensing a rotation angle of a motor for moving the rod; and a position calculating process of calculating a position of the rod of a linear actuator based on a position sensing value of the position sensor and a rotation angle sensing value of the rotation sensor.

A position calculating device for achieving the above object is applied to a linear actuator including a rod capable of moving in an axial direction, a motor for moving the rod, a position sensor for sensing a relative position of the rod relative to a preset reference position, and a rotation sensor for sensing a rotation angle of the motor, and the position calculating device includes a position calculating unit for calculating a position of the rod based on a position sensing value of the position sensor and a rotation angle sensing value of the rotation sensor.

A linear actuator for achieving the above object includes: a piston configured to move linearly in accordance with a fluid pressure introduced into an inner space of a housing; a rod fixed to the piston and configured to move linearly along with the piston; a conversion mechanism for converting a linear motion of the rod into a rotational motion; at least one position sensor for sensing a relative position of the rod relative to a preset reference position; at least one rotation sensor for sensing a rotation angle of the rotational motion produced by the conversion mechanism; and a position calculating unit for calculating a position of the rod based on a position sensing value of the at least one position sensor and a rotation angle sensing value of the at least one rotation sensor.

With the above configuration, the position sensor can sense, with some degree of precision, the relative position of the rod relative to the preset reference position. The rotation angle of the motor sensed by the rotation sensor is then added to the relative position of the rod sensed by the position sensor, thereby obtaining the relative position of the rod with a high precision beyond the capability of the position sensor alone.

It is also possible that the above linear actuator further includes: a storage unit for storing the position sensing value and the rotation angle sensing value; and a setting unit for causing the storage unit to store, as initial values, the position sensing value and the rotation angle sensing value, both obtained when the rod is at the reference position, and the position calculating unit calculates the position of the rod based on the position sensing value relative to the initial value thereof and the rotation angle sensing value relative to the initial value thereof.

It is also possible that in the above linear actuator, the at least one position sensor includes a plurality of position sensors, and the at least one rotation sensor includes a plurality of rotation sensors.

It is also possible that in the above linear actuator, the at least one position sensor includes a plurality of position sensors, and the at least one rotation sensor includes one rotation sensor.

DESCRIPTION OF THE EMBODIMENTS

First Embodiment

The following describes a first embodiment with reference to FIGS. 1 to 4. A linear actuator 100 hereinafter described is used as, for example, a drive source for operating a moving surface of an aircraft.

Figure 1:
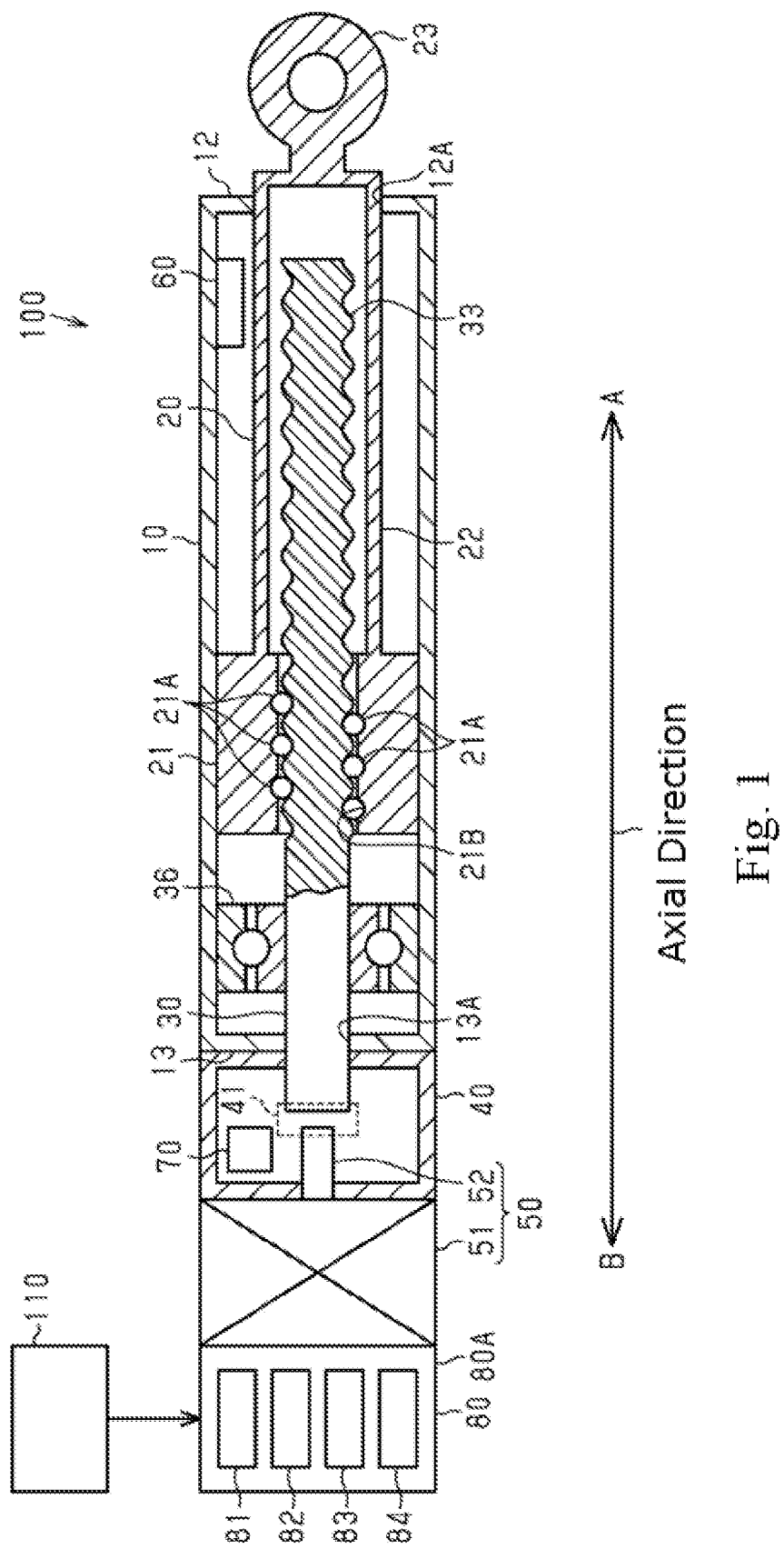
FIG. 1 is a sectional view of a linear actuator according to a first embodiment.

First, a description is given of the linear actuator 100. The linear actuator 100 includes an electric motor 50. The motor 50 includes a body portion 51 having a generally cylindrical shape. An output shaft 52 having a generally cylindrical shape projects from the axial direction A side (the right side in FIG. 1) of the body portion 51. The output shaft 52 rotates relative to the body portion 51 when the body portion 51 is electrically powered. FIG. 1 does not show the internal structure of the body portion 51 of the motor 50.

A gear housing 40 having a hollow and generally cylindrical shape is fixed to the axial direction A side of the body portion 51 of the motor 50. The inner space of the gear housing 40 has a generally cylindrical shape. The inner space of the gear housing 40 contains a portion of the output shaft 52 of the motor 50 that penetrates the wall of the gear housing 40 on the axial direction B side (the left side in FIG. 1). Further, the inner space of the gear housing 40 contains a gear mechanism 41 coupled to the output shaft 52 of the motor 50. The gear mechanism 41 is constituted by a plurality of gears and is configured to transmit a drive force by reducing the rotation speed of the output shaft 52. In FIG. 1, the gear mechanism 41 is simplified.

A housing 10 having a hollow and generally cylindrical shape is fixed to the axial direction A side of the gear housing 40. The inner space of the housing 10 has a generally cylindrical shape. The end wall 12 of the housing 10 on the axial direction A side is penetrated by a through-hole 12A in the thickness direction thereof. The through-hole 12A has a circular shape in plan view and is positioned at the center of the end wall 12. The end wall 13 of the housing 10 on the axial direction B side is penetrated by a through-hole 13A in the thickness direction thereof. The through-hole 13A has a circular shape in plan view and is positioned at the center of the end wall 13.

The housing 10 contains a ball screw 30 having a generally cylindrical shape. The outer peripheral surface of the ball screw 30 has a thread groove 33 spirally cut therein. The thread groove 33 is provided in the axial direction A side of the ball screw 30. The axial direction B side of the ball screw 30 penetrates the through-hole 13A of the housing 10, and the end portion of the ball screw 30 on the axial direction B side is positioned in the inner space of the gear housing 40. The end portion of the ball screw 30 on the axial direction B side is coupled to the output shaft 52 of the motor 50 via the gear mechanism 41. The central axis of the ball screw 30 is aligned with the central axis of the housing 10.

A bearing 36 is provided between the outer peripheral surface of the ball screw 30 and the inner peripheral surface of the housing 10. The bearing 36 is positioned on the portion of the ball screw 30 where no thread groove 30 is provided. The bearing 36 supports the ball screw 30 such that the ball screw 30 is rotatable relative to the housing 10.

The housing 10 contains a rod 20 which as a whole has a rod shape. The rod 20 includes a nut 21 positioned on the axial direction B side and a rod body 22 positioned on the axial direction A side. The nut 21 has a cylindrical shape and has a spiral groove 21B formed spirally in the inner peripheral surface thereof. One end of the spiral groove 21B is connected to the other end of the spiral groove 21B through a connection path (not shown). The spiral groove 21B contains a plurality of balls 21A. The rod body 22, which has a hollow and cylindrical shape, extends from the end surface of the nut 21 on the axial direction A side. The end portion of the rod body 22 on the axial direction A side penetrates the through-hole 12A of the housing 10 and projects out of the housing 10. The axial direction B side of the rod body 22 is open, such that the inner space of the rod body 22 communicates with the inner space of the nut 21. A fixing portion 23 having a generally annular shape projects from the end surface of the rod body 22 on the axial direction A side. Although not shown, an apparatus such as a moving surface of an aircraft is fixed to the fixing portion 23 so as to be operated by the linear actuator 100.

The ball screw 30 is inserted in the nut 21 and the rod body 22 of the rod 20. The plurality of balls 21A mentioned above are interposed between the spiral groove 21B in the nut 21 of the rod 20 and the thread groove 33 of the ball screw 30. When the ball screw 30 is rotated, the balls 21A advance in the thread groove 33 of the ball screw 30. Accordingly, the rod 20 moves in the axial direction relative to the ball screw 30.

A position sensor 60 for sensing the position of the rod 20 is provided in the housing 10. The position sensor 60 senses the relative position of the rod 20 in the axial direction relative to the position of the rod 20 taken when the nut 21 is at its most proximal position on the axial direction B side. Therefore, the position of the rod 20 taken when the nut 21 is at its most proximal position on the axial direction B side is the preset reference position. The position sensor 60 is capable of sensing over the entire stroke range of the rod 20 in the axial direction. An example of the position sensor 60 is an LVDT (differential transformer) that varies its output voltage in accordance with the position of the rod 20. The position sensor 60 accomplishes the relative position sensing step.

Further, the gear housing 40 contains a rotation sensor 70 for sensing the rotation angle of the motor 50. The rotation sensor 70 senses the rotation angle of the output shaft 52 of the motor 50. An example of the rotation sensor 70 is a resolver that varies its output voltage in accordance with the rotation angle of the output shaft 52. The rotation sensor 70 accomplishes the rotation angle sensing step.

A control housing 80A which as a whole has a cylindrical external shape is fixed to the end portion of the body portion 51 of the motor 50 on the axial direction B side. The control housing 80A contains a controller 80 for performing various processes. The controller 80 is constituted by a microcomputer. The various processes are performed by the controller 80 configured as a computer executing the programs stored on the controller 80.

The controller 80 receives a signal indicating a position sensing value obtained by the position sensor 60. The controller 80 also receives a signal indicating a rotation angle sensing value obtained by the rotation sensor 70. The controller 80 thus obtains the position sensing value and the rotation angle sensing value.

The controller 80 includes a control unit 81 for controlling the motor 50. The control unit 81 outputs a control signal to the body portion 51 of the motor 50. As the output shaft 52 rotates in the circumferential direction, the ball screw 30 rotates. The rotation of the ball screw 30 causes the rod 20 to move in the axial direction relative to the ball screw 30.

The controller 80 also includes a position calculating unit 82 for calculating the position of the rod 20 relative to the reference position of the rod 20, based on the position sensing value of the position sensor 60 and the rotation angle sensing value of the rotation sensor 70. The position calculating unit 82 accomplishes the position calculating step. The controller 80 also includes a storage unit 83 for storing the position sensing value of the position sensor 60 and the rotation angle sensing value of the rotation sensor 70. The controller 80 also includes a setting unit 84 for causing the storage unit 83 to store, as initial values, the position sensing value of the position sensor 60 and the rotation angle sensing value of the rotation sensor 70, both obtained when the rod 20 is at the reference position. FIG. 1 schematically shows the controller 80 with its categorized functions.

The controller 80 is electrically connected with a general controller 110 for controlling a plurality of linear actuators 100. The general controller 110 supervises and controls the plurality of linear actuators 100 to drive the moving surfaces of the aircraft in accordance with the manipulation of a pilot. The general controller 110 outputs a control signal to the controller 80 of each of the plurality of linear actuators 100. An example of the general controller 110 is a flight controller.

Next, a description is given of a series of steps in a setting process performed by the controller 80 for setting the initial values of the position sensing value and the rotation angle sensing value. The controller 80 performs the series of steps in the setting process when determining that the storage unit 83 does not store the initial values normally. Specifically, the series of steps in the setting process are performed when the controller 80 is first electrically connected to the general controller 110 and when the maintenance of the linear actuator 100 is performed after the initial values stored on the storage unit 83 are cleared.

Figure 2:
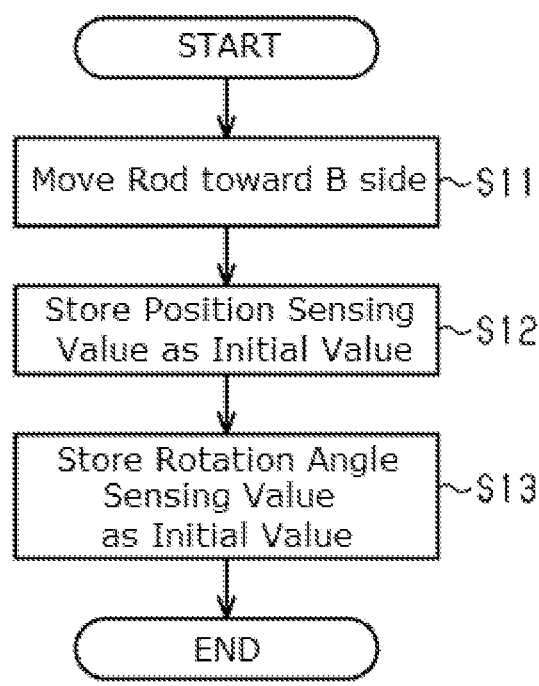
FIG. 2 is a flowchart showing a setting process performed by a controller.

As shown in FIG. 2, in step S11, the control unit 81 of the controller 80 allows the motor 50 to be electrically powered for a given amount of time such that the rod 20 moves toward the axial direction B side of the thread groove 33 in the ball screw 30. The given amount of time is previously set to be larger than the amount of time required for the nut 21 to move from its most distal position on the axial direction A side to its most proximal position on the axial direction B side. Therefore, as a result of step S11, the nut 21 reaches its most proximal position in the screw groove 33 on the axial direction B side. The controller 80 then proceeds to step S12.

In step S12, the setting unit 84 of the controller 80 causes the storage unit 83 to store the position sensing value of the position sensor 60 obtained at the time of completion of step S11 as the initial value of the position sensing value. The controller 80 then proceeds to step S13.

In step S13, the setting unit 84 of the controller 80 causes the storage unit 83 to store the rotation angle sensing value of the rotation sensor 70 obtained at the time of completion of step S11 as the initial value of the rotation angle sensing value. The controller 80 then ends the setting process. After the setting process is ended, the position of the rod 20 is calculated relative to the newly set initial values of the position sensing value of the position sensor 60 and the rotation angle sensing value of the rotation sensor 70.

Next, a description is given of a series of steps in the position calculating process performed by the controller 80 for calculating the position of the rod 20, and the function of the process. The controller 80 repeats the series of steps in the position calculating process during the period from the time when the controller 80 is started to the time when the controller 80 ends its operation.

Figure 3:
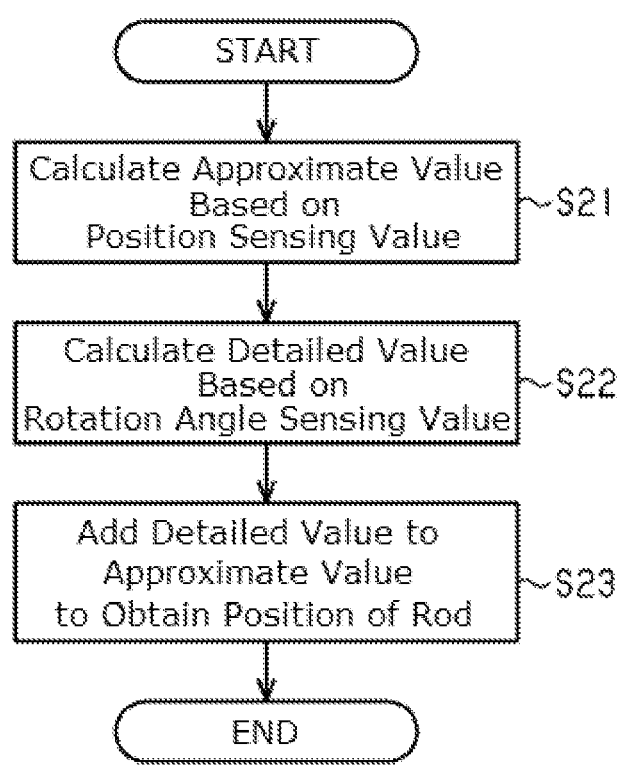
FIG. 3 is a flowchart showing a position calculating process performed by the controller.
Figure 4:
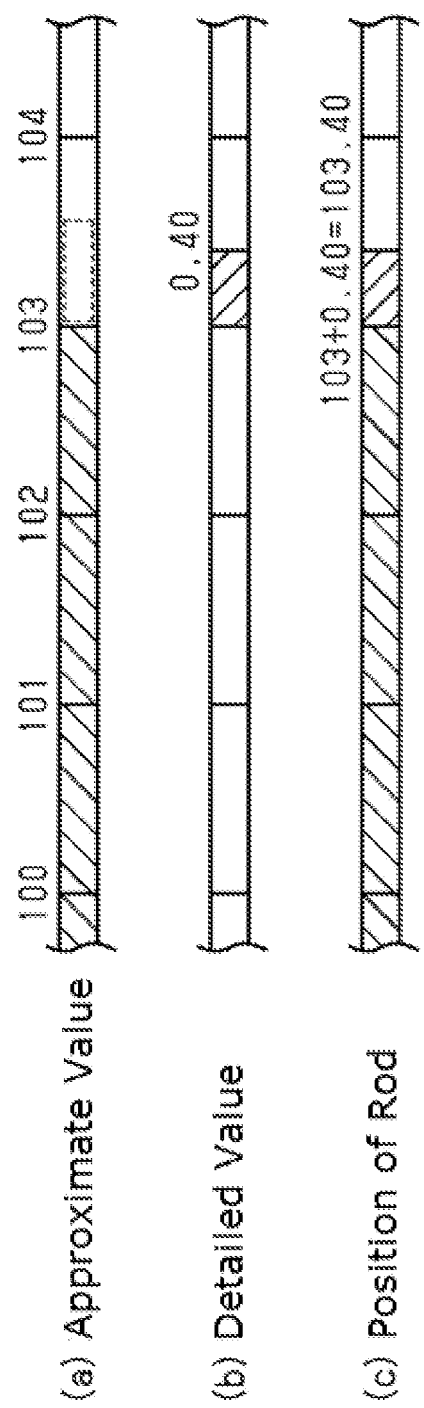
FIG. 4 includes Parts (a), (b), and (c), wherein Part (a) shows a process for calculating an approximate value in the position calculating process, Part (b) shows a process for calculating a detailed value in the position calculating process, and Part (c) shows a process for calculating the position of the rod relative to a reference position in the position calculating process.

As shown in FIG. 3, in step S21, the position calculating unit 82 of the controller 80 calculates an approximate value based on the initial value of the position sensing value and a position sensing value obtained at the time of step S21. Specifically, the position calculating unit 82 calculates the current position of the rod 20 relative to the preset reference position based on the difference between the initial value of the position sensing value and the position sensing value obtained at the time of step S21. The position calculating unit 82 then discards the fractional part of the calculated current position of the rod 20 relative to the preset reference position and takes the integral part as the approximate value. For example, as shown in Part (a) of FIG. 4, when the position sensing value of the position sensor 60 is 103 or more and less than 104, the fractional part shown by the broken line is discarded to calculate the approximate value at 103. The controller 80 then proceeds to step S22.

As shown in FIG. 3, in step S22, the position calculating unit 82 calculates a detailed value based on the initial value of the rotation angle sensing value and a rotation angle sensing value obtained at the time of step S21. Specifically, the position calculating unit 82 calculates the current rotational position of the output shaft 52 of the motor 50 as a rotation angle, based on the difference between the initial value of the rotation angle sensing value and the rotation angle sensing value obtained at the time of step S21, with the rotational position of the output shaft 52 of the motor 50 obtained when the rod 20 is at the reference position taken as 0°. The position calculating unit 82 then converts the current rotation angle of the output shaft 52 into the amount of movement of the rod 20 in the axial direction, and takes the value obtained by the conversion as the detailed value. In converting the rotation angle of the output shaft 52 into the amount of movement of the rod 20 in the axial direction, the reduction ratio of the gear mechanism 41 is taken into account.

For example, suppose that the rod 20 moves by 1 in the axial direction each time the output shaft 52 of the motor 50 rotates 180°. As the rotation angle of the output shaft 52 changes from 0° toward 180°, the amount of movement of the rod 20 in the axial direction changes from 0 toward 1, and when the rotation angle of the output shaft 52 reaches 180°, the amount of movement of the rod 20 is 0 again. As the rotation angle of the output shaft 52 changes from 180° toward 360°, the amount of movement of the rod 20 changes from 0 toward 1. In this way, the amount of movement of the rod 20 in the axial direction is calculated in the range from 0 to less than 1 on a 180-degree cycle in accordance with the angle of the output shaft 52 changing in the range from 0° to less than 360°. Specifically, as shown in Part (b) of FIG. 4, when the rotation angle of the output shaft of the motor 50 is calculated at 252°, the detailed value of the amount of movement of the rod 20 in the axial direction is calculated at 0.40. The controller 80 then proceeds to step S23.

As shown in FIG. 3, in step S23, the position calculating unit 82 adds the detailed value calculated in step S22 of the current run to the approximate value calculated in step S21 of the current run to obtain the position of the rod 20. For example, as shown in Part (c) of FIG. 4, when the approximate value calculated in step S21 of the current run is 103, and the detailed value calculated in step S22 of the current run is 0.40, the sum of these values, amounting to 103.40, is taken as the relative value of the rod 20 relative to the reference position. The controller 80 then ends the position calculating process of the current run.

Advantageous effects of the embodiment will be now described. (1) Since the position sensor 60 senses the relative position of the rod 20 in the axial direction in a continuous manner, sensing errors in the axial direction accumulate. Therefore, the position sensing precision of the position sensor 60 tends to be lower as the stroke range of the rod 20 in the axial direction is larger. On the other hand, the rotation sensor 70 senses the angle of the output shaft 52 of the motor 50 making one rotation, and therefore, sensing errors are less prone to accumulate as in the position sensor 60, even supposing a larger stroke range of the rod 20 in the axial direction increases the number of rotations of the output shaft 52 of the motor 50. Therefore, in the rotation sensor 70, the sensing precision of the rotation angle sensing value is less prone to be lower for a larger stroke range of the rod 20 in the axial direction. The position calculating unit 82 of the controller 80 calculates the approximate value of the relative position of the rod 20 relative to the preset reference position, based on the position sensing value obtained by the position sensor 60 capable of sensing the position over the entire stroke range of the rod 20. The position calculating unit 82 of the controller 80 also calculates the detailed value of the relative position of the rod 20 relative to the preset reference position, based on the rotation angle sensing value obtained by the rotation sensor 70. Further, the position calculating unit 82 of the controller 80 calculates the relative position of the rod 20 relative to the preset reference position by adding the detailed value calculated from the rotation angle sensing value of the rotation sensor 70 to the approximate value calculated from the position sensing value of the position sensor 60. In this way, the position calculating unit 82 of the controller 80 calculates, with some degree of precision, the relative position of the rod 20 relative to the preset reference position, based on the position sensing value of the position sensor 60. The rotation angle sensing value of the rotation sensor 70 is then added, to finally calculate the relative position of the rod 20 relative to the preset reference position with a high precision. Since the relative position of the rod 20 relative to the preset reference position can be calculated with a high precision, the moving surface of the aircraft can be operated with an increased accuracy. As a result, when a plurality of linear actuators 100 are used to drive the same moving surface, it can be prevented that the moving surface is distorted due to the difference between the positions of the rods 20 driven in these linear actuators 100.

(2) Due to errors in manufacture and aging after manufacture of the linear actuator 100, the position sensing value of the position sensor 60 and the rotation angle sensing value of the rotation sensor 70 obtained when the rod 20 is at the reference position may be different from the respective initial values. In this case, the position calculating unit 82 of the controller 80 incorrectly calculates the relative position of the rod 20 relative to the preset reference position. To address this problem, the setting unit 84 of the controller 80 causes the storage unit 83 to store, as the initial value of the position sensing value, the position sensing value of the position sensor 60 obtained when the nut 21 is at its most proximal position on the axial direction B side. The setting unit 84 of the controller 80 also causes the storage unit 83 to store the rotation angle sensing value of the rotation sensor 70 obtained when the nut 21 is at its most proximal position on the axial direction B side as the initial value of the rotation angle sensing value. In this way, the setting unit 84 of the controller 80 causes the storage unit 83 to store the position sensing value and the rotation angle sensing value obtained when the rod 20 is at the same reference position as the initial value of the position sensing value and the initial value of the rotation angle sensing value. This makes it possible to newly set the initial values in accordance with the position of the rod 20 in case of errors in manufacture and aging after manufacture of the linear actuator 100.

(3) The position sensor 60 is constituted by an LVDT. Since a typical LVDT outputs an output voltage in accordance with the position of the rod 20, it is possible to directly grasp the position of the rod 20 independently of information such as temporal change of the output voltage. In addition, the LVDT can sense the position of the rod 20 over a relatively large range. On the other hand, the LVDT outputs a voltage in accordance with the relative position of the rod 20 relative to the reference position, and therefore, the resolution of the output voltage is limited with the fixed reference voltages, possibly resulting in an insufficient precision. To address this problem, a resolver is employed as the rotation sensor 70. Since a typical resolver outputs different numbers of pulses in accordance with the rotation angle, ensuring a relatively high precision. On the other hand, for sensing rotation angles of 360° or larger, the resolver needs to count and store the number of rotations of the output shaft 52 from its initial position. If the stored count is lost, the resolver fails to sense the rotation angle. The resolver is thus vulnerable to instantaneous power failure. Since the rotation sensor 70 is used to sense the amount of movement of the rod 20, it is possible to sense the amount of movement of the rod 20 with a high precision. The rotation sensor 70 is used solely for calculating the detailed value of the amount of movement of the rod 20. Therefore, even if an instantaneous power failure occurs and thus the rotation sensor 70 fails to sense the rotation angle of the output shaft 52, the amount of movement of the rod 20 can be sensed by the position sensor 60 with an adequate precision. Accordingly, it is less likely that an instantaneous power failure makes it totally impossible to sense the amount of movement of the rod 20.

Second Embodiment

Figure 5:
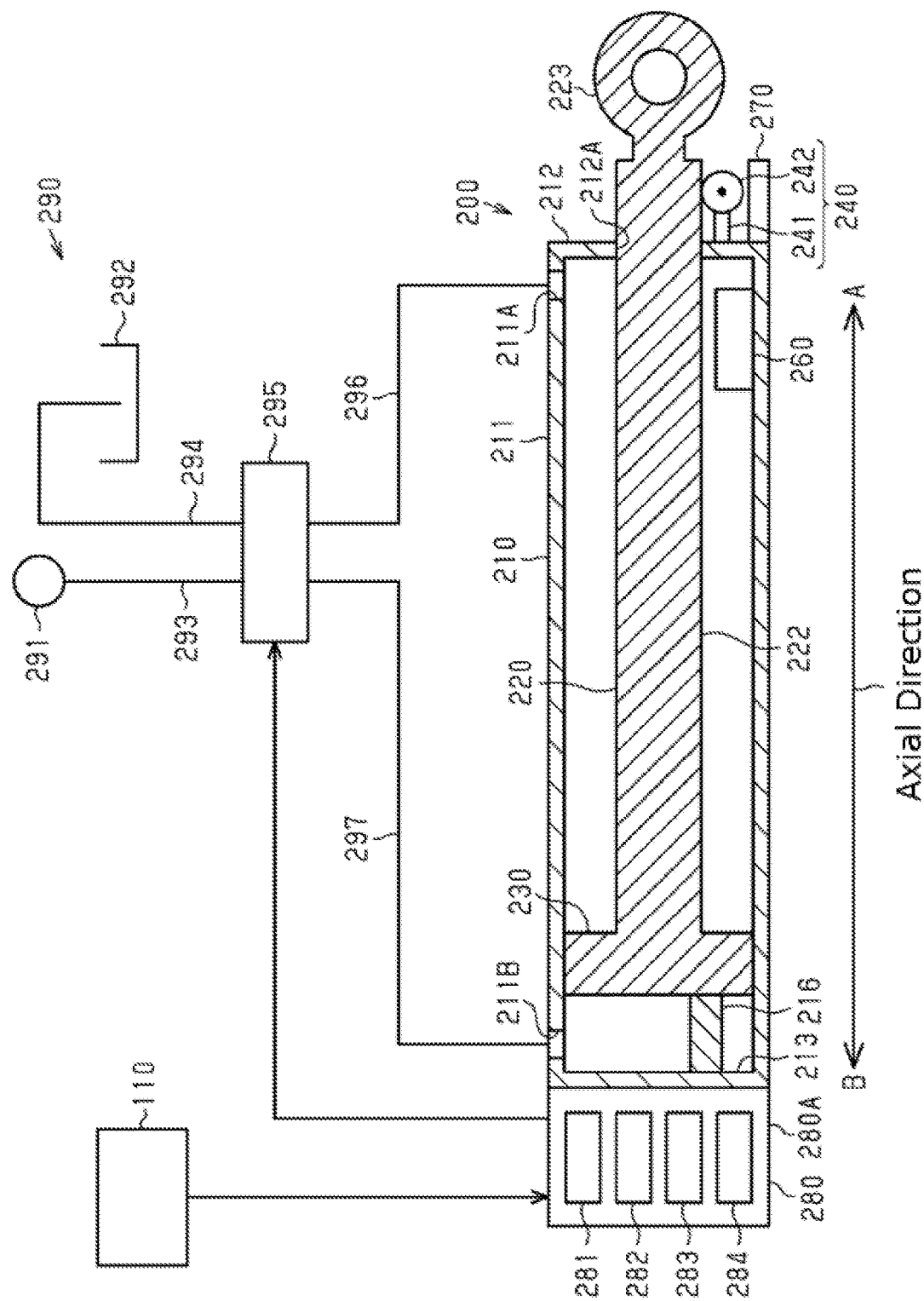
FIG. 5 is a sectional view of a linear actuator according to a second embodiment.

The following describes a second embodiment with reference to FIG. 5. The following description of the second embodiment will be focused on the differences from the first embodiment, and the same elements as in the first embodiment will be denoted by the same reference numerals and descriptions thereof will be omitted or simplified.

First, a description is given of a linear actuator 200. The linear actuator 200 includes a housing 210 having a hollow and generally cylindrical shape. The inner space of the housing 210 has a generally cylindrical shape. An outer peripheral wall 211 of the housing 210 is penetrated by a first communication hole 211A in the radial direction. The first communication hole 211A is positioned in the end portion of the outer peripheral wall 211 on the axial direction A side (the right side in FIG. 5). The outer peripheral wall 211 is also penetrated by a second communication hole 211B in the radial direction. The second communication hole 211B is positioned in the end portion of the outer peripheral wall 211 on the axial direction B side (the left side in FIG. 5). The end wall 212 of the housing 210 on the axial direction A side is penetrated by a through-hole 212A in the thickness direction thereof. The through-hole 212A has a circular shape in plan view and is positioned at the center of the end wall 212. A stopper 216 extends from the end wall 213 of the housing 210 on the axial direction B side toward the axial direction A side.

The housing 210 contains a piston 230 having a generally disc-like shape. The outer diameter of the piston 230 is generally the same as the inner diameter of the housing 210. The central axis of the piston 230 is aligned with the central axis of the housing 210. The piston 230 is capable of moving in the axial direction relative to the housing 210 in accordance with the hydraulic pressure introduced into the housing 210. In other words, the piston 230 is capable of moving linearly along the axial direction of the housing 210.

A rod 220 which as a whole has a rod-like shape extends from the end surface of the piston 230 on the axial direction A side. The rod 220 includes a rod body 222 extending from the central portion of the piston 230. The end portion of the rod body 222 on the axial direction A side penetrates the through-hole 212A of the housing 210 and projects out of the housing 210. A fixing portion 223 having a generally annular shape projects from the end surface of the rod body 222 on the axial direction A side. Although not shown, an apparatus such as a moving surface of an aircraft is fixed to the fixing portion 223 so as to be operated by the linear actuator 200. The rod 220 is fixed to the piston 230 and thus capable of moving linearly along the axial direction of the housing 210 along with the piston 230. The rod 220 and the piston 230 are integrated together.

A conversion mechanism 240 for converting the linear motion of the rod 220 into a rotational motion is fixed to the end surface of the end wall 212 of the housing 210 on the axial direction A side. The conversion mechanism 240 includes a support portion 241 extending from the end surface of the end wall 212 toward the axial direction A side. The conversion mechanism 240 also includes a rotational portion 242 which as a whole has a disc-like shape. The rotational portion 242 is supported on an end portion of the support portion 241 on the axial direction A side. The rotational portion 242 is configured to rotate relative to the support portion 241. The outer peripheral surface of the rotational portion 242 is in contact with the outer wall of the rod body 222. As the rod 220 moves in the axial direction, the rotational portion 242 rotates relative to the support portion 241. Examples of the rotational portion 242 include a gear and a roller.

A rotation sensor 270 for sensing the rotation angle of the rotational motion produced by the conversion mechanism 240 is fixed to the end surface of the end wall 212 of the housing 210 on the axial direction A side. The rotation sensor 270 senses the rotation angle of the rotational portion 242 relative to the support portion 241. An example of the rotation sensor 270 is a resolver that varies its output voltage in accordance with the rotation angle of the rotational portion 242. The rotation sensor 270 accomplishes the rotation angle sensing step.

A position sensor 260 for sensing the position of the rod 220 is provided in the housing 210. As shown in FIG. 5, the position sensor 260 senses the relative position of the rod 220 in the axial direction relative to the position of the rod 220 taken when the piston 230 contacts with the stopper 216. Therefore, the position of the rod 220 taken when the piston 230 contacts with the stopper 216 is the preset reference position. The position sensor 260 is capable of sensing over the entire stroke range of the rod 220 in the axial direction. An example of the position sensor 260 is an LVDT (differential transformer) that varies its output voltage in accordance with the position of the rod 220. The position sensor 260 accomplishes the relative position sensing step.

The housing 210 of the linear actuator 200 is connected with a hydraulic circuit 290. The hydraulic circuit 290 includes a hydraulic pressure source 291 for feeding an oil. The hydraulic pressure source 291 is connected with one end of a feeding passage 293 that conveys the oil. The other end of the feeding passage 293 is connected with a flow path switching mechanism 295 for controlling the flow of the oil. The flow path switching mechanism 295 is fed with the oil from the hydraulic pressure source 291 via the feeding passage 293.

The flow path switching mechanism 295 is also connected with one end of a discharging passage 294 that conveys the oil. The other end of the discharging passage 294 is connected with a reservoir 292 that stores the oil. The reservoir 292 receives the oil discharged from the flow path switching mechanism 295 side via the discharging passage 294.

The flow path switching mechanism 295 is also connected with one end of a first passage 296 that conveys the oil. The other end of the first passage 296 is connected with the first communication hole 211A of the housing 210. Further, the flow path switching mechanism 295 is also connected with one end of a second passage 297 that conveys the oil. The other end of the second passage 297 is connected with the second communication hole 211B of the housing 210.

A control housing 280A which as a whole has a cylindrical external shape is fixed to the end surface of the end wall 213 of the housing 210 on the axial direction B side. The control housing 280A contains a controller 280 for performing various processes. The controller 280 is constituted by a microcomputer. The various processes are performed by the controller 280 configured as a computer executing the programs stored on the controller 280.

The controller 280 receives a signal indicating a position sensing value obtained by the position sensor 260. The controller 280 also receives a signal indicating a rotation angle sensing value obtained by the rotation sensor 270. The controller 280 thus obtains the position sensing value and the rotation angle sensing value.

The controller 280 includes a control unit 281 for controlling the flow path switching mechanism 295. The control unit 281 outputs a control signal to the flow path switching mechanism 295. The flow path switching mechanism 295 is controlled in accordance with the control signal such that, for example, the feeding passage 293 is connected with the second passage 297, and the discharging passage 294 is connected with the first passage 296. With these connections, the oil is fed into the inner space of the housing 210 on the axial direction B side of the piston 230, and at the same time, the oil is discharged from the inner space of the housing 210 on the axial direction A side of the piston 230. Accordingly, the piston 230 moves toward the axial direction A side relative to the housing 210. The rod 220 moves along with the piston 230 toward the axial direction A side relative to the housing 210. Alternatively, the flow path switching mechanism 295 is controlled in accordance with the control signal such that, for example, the feeding passage 293 is connected with the first passage 296, and the discharging passage 294 is connected with the second passage 297. With these connections, the oil is fed into the inner space of the housing 210 on the axial direction A side of the piston 230, and at the same time, the oil is discharged from the inner space of the housing 210 on the axial direction B side of the piston 230. Accordingly, the piston 230 moves toward the axial direction B side relative to the housing 210. The rod 220 moves along with the piston 230 toward the axial direction B side relative to the housing 210.

The controller 280 also includes a position calculating unit 282 for calculating the position of the rod 220 relative to the reference position of the rod 220, based on the position sensing value of the position sensor 260 and the rotation angle sensing value of the rotation sensor 270. The position calculating unit 282 accomplishes the position calculating step. The controller 280 also includes a storage unit 283 for storing the position sensing value of the position sensor 260 and the rotation angle sensing value of the rotation sensor 270. The controller 280 also includes a setting unit 284 for causing the storage unit 283 to store, as initial values, the position sensing value of the position sensor 260 and the rotation angle sensing value of the rotation sensor 270, both obtained when the rod 220 is at the reference position. FIG. 5 schematically shows the controller 280 with its categorized functions. The controller 280 is electrically connected with a general controller 110 for controlling a plurality of linear actuators 200.

In the second embodiment, the controller 280 performs the same series of steps in the setting process as in the first embodiment when determining that the storage unit 283 does not store the initial values normally. The controller 280 also repeats the same series of steps in the position calculating process as in the first embodiment during the period from the time when the controller 280 is started to the time when the controller 280 ends its operation. Accordingly, the advantageous effects of the second embodiment are the same as the advantageous effects (1) to (3) of the first embodiment described above.

The foregoing embodiments are susceptible to the following modifications. The above embodiments and the following modifications can be implemented in combination to the extent where they are technically consistent to each other. In addition, the following modifications can be applied to both the first and second embodiments to the extent where there is no technical inconsistency.

In the first embodiment, both the number of the position sensors 60 and the number of the rotation sensors 70 can be modified within the range equal to or greater than one. For example, two position sensors 60 and two rotation sensors 70 may be provided. In this configuration, even when a part of the position sensors 60 or the rotation sensors 70 stops functioning, leaving at least one other position sensor 60 and at least one other rotation sensor 70 still functioning, the position of the rod 20 can be calculated based on the position sensing value of the at least one other position sensor 60 and the rotation angle sensing value of the at least one other rotation sensor 70 still functioning.

For example, two position sensors 60 and one rotation sensor 70 may be provided. In this configuration, even when one of the two position sensors 60 stops functioning, an approximate value of the amount of movement of the rod 20 can be calculated based on the position sensing value of the other position sensor 60 still functioning. On the other hand, when the rotation sensor 70 stops functioning, a detailed value of the amount of movement of the rod 20 cannot be calculated. In such a case, the amount of movement of the rod 20 can be obtained with some degree of precision using the position sensor 60 functioning normally. The costs required for only one rotation sensor 70 are lower than those required for two or more rotation sensors 70 that increase with the number of the rotation sensors 70. Supposing that two rotation sensors 70 are provided, maintenance of the linear actuator 100 is necessary when any of the two rotation sensors 70 malfunctions or stops functioning. With this respect, in the above configuration, only one rotation sensor 70 is provided, resulting in lower frequency of maintenance for the rotation sensor 70.

In the first embodiment, the controller 80 may be configured as a component separate and independent from the linear actuator 100. In this case, the controller 80 operates as a position calculating device applied to the linear actuator 100.

In the first embodiment, the configuration of the controller 80 can be modified. For example, the setting unit 84 of the controller 80 may be omitted. In this case, when the linear actuator 100 is manufactured, the initial value of the position sensing value and the initial value of the rotation angle sensing value should be set to correspond to each other.

For example, it is also possible that the controller not integrated with and thus separate from the linear actuator 100 includes the position calculating unit. In this case, the controller including the position calculating unit operates as a position calculating device applied to the linear actuator 100.

In the first embodiment, the sensor employed as the position sensor 60 can be changed. For example, a magnetostrictive sensor may be employed as the position sensor 60.

In the first embodiment, the sensor used as the rotation sensor 70 can be changed. For example, an optical or magnetic encoder may be employed as the rotation sensor 70. For another example, when the motor 50 is a brushless motor, a sensor utilizing a hall element provided in the motor 50 may be employed as the rotation sensor 70.

In the first embodiment, the direct object of sensing by the rotation sensor 70 is not limited to the output shaft 52. For example, the rotation sensor 70 may sense the rotation angle of the ball screw 30 or a gear in the gear mechanism 41. In these cases, the rotation sensor 70 can also sense the rotation angle of the motor 50 indirectly.

In the first embodiment, the rotation sensor 70 may be mounted at any different position. For example, the rotation sensor 70 may be mounted in the body portion 51 of the motor 50 or mounted in the housing 10.

In the second embodiment, the direct object of sensing by the position sensor 260 is not limited to the rod 220. For example, the position sensor 260 may sense the relative position of the piston 230. In this case, the position sensor 260 can also sense the relative position of the rod 220 indirectly.

In the second embodiment, the fluid fed to the housing 210 of the linear actuator 200 is not limited to an oil. For example, the fluid fed to the housing 210 may be the air in place of the oil.

In the first embodiment, the preset reference position of the rod 20 can be modified. For example, the preset reference position may be the position of the rod 20 taken when the nut 21 is at its most distal position on the axial direction A side.

In the first embodiment, the screw mechanism contained in the housing 10 is not limited to the ball screw 30, and it may be changed to others. For example, it may be a screw used for a linear-motion mechanism.

In the first embodiment, the type of the motor 50 is not particularly limited, and it may be a brush motor, a brushless DC motor, an AC motor, and so forth.

In the first embodiment, the linear actuator 100 is used as a drive source for operating a moving surface of an aircraft, but this is not limitative. For example, the linear actuator 100 may be used as a drive source for a railroad brake, a railroad door, an automobile brake, a construction machine arm, an automatic door for a building, and so forth.

Other Embodiments

The following numbered examples are embodiments.

1. A linear actuator comprising:
a piston configured to move linearly in accordance with a fluid pressure introduced into an inner space of a housing;
a rod fixed to the piston and configured to move linearly along with the piston;
a conversion mechanism for converting a linear motion of the rod into a rotational motion;
at least one position sensor for sensing a relative position of the rod relative to a preset reference position;
at least one rotation sensor for sensing a rotation angle of the rotational motion produced by the conversion mechanism; and
a position calculating unit for calculating a position of the rod based on a position sensing value of the at least one position sensor and a rotation angle sensing value of the at least one rotation sensor.

2. The linear actuator of example 1, further comprising:
a storage unit for storing the position sensing value and the rotation angle sensing value; and
a setting unit for causing the storage unit to store, as initial values, the position sensing value and the rotation angle sensing value, both obtained when the rod is at the reference position,
wherein the position calculating unit calculates the position of the rod based on the position sensing value relative to the initial value thereof and the rotation angle sensing value relative to the initial value thereof.

3. The linear actuator of example 1 or 2, wherein the at least one position sensor comprises a plurality of position sensors, and the at least one rotation sensor comprises a plurality of rotation sensors.

4. The linear actuator of example 1 or 2, wherein the at least one position sensor comprises a plurality of position sensors, and the at least one rotation sensor comprises one rotation sensor.

5. A position calculating device,
wherein the position calculating device is applied to a linear actuator including a rod capable of moving in an axial direction, a motor for moving the rod, a position sensor for sensing a relative position of the rod relative to a preset reference position, and a rotation sensor for sensing a rotation angle of the motor, and
wherein the position calculating device includes a position calculating unit for calculating a position of the rod based on a position sensing value of the position sensor and a rotation angle sensing value of the rotation sensor.

What is claimed is:

1. A linear actuator comprising:
a rod configured to move in an axial direction;
a motor configured to move the rod, the motor including an output shaft;
at least one position sensor configured to sense a relative position of the rod relative to a preset reference position and to output a position sensing value representing the relative position of the rod;
at least one rotation sensor configured to sense a rotation angle of the output shaft of the motor and to output a rotation angle sensing value representing the rotation angle of the output shaft of the motor; and
a position calculator configured to calculate a position of the rod based on the position sensing value of the at least one position sensor representing the relative position of the rod and the rotation angle sensing value of the at least one rotation sensor representing the rotation angle of the output shaft of the motor.

2. The linear actuator of claim 1, further comprising:
a storage unit configured to store the position sensing value and the rotation angle sensing value; and
a setting unit configured to cause the storage unit to store, as initial values, the position sensing value and the rotation angle sensing value, both obtained when the rod is at the reference position,
wherein the position calculator configured to calculate the position of the rod based on the position sensing value relative to the initial value thereof and the rotation angle sensing value relative to the initial value thereof.

3. The linear actuator of claim 1, wherein the at least one position sensor comprises a plurality of position sensors, and
wherein the at least one rotation sensor comprises a plurality of rotation sensors.

4. The linear actuator of claim 1, wherein the at least one position sensor comprises a plurality of position sensors, and
wherein the at least one rotation sensor comprises one rotation sensor.

5. The linear actuator of claim 1, wherein the position sensing value of the position sensor includes an integral part and a fractional part,
wherein the position calculator is configured to obtain the position sensing value of the position sensor and calculate an integral value that represents an approximate value of the position of the rod, by discarding the fractional part of the position sensing value of the position sensor and taking the integral part of the position sensing value of the position sensor.

6. The linear actuator of claim 5
wherein the position calculator is configured to obtain the rotation angle sensing value of the at least one rotation sensor and calculate a fractional value that represents a detailed value of an amount of movement of the rod in the axial direction and that changes in a range between 0 to 1 on a 180-degree cycle in accordance with an angle of the output shaft of the motor changing in the range from 0° to less than 360°, and
wherein the position calculator configured to add the integral value that represents the approximate value of the position of the rod and the fractional value that represents the detailed value of the amount of movement of the rod in the axial direction to calculate the position of the rod.

7. A method for calculating a position of a rod, comprising:
a relative position sensing step of sensing, by a position sensor, a position of a rod that is included in a linear actuator, is driven by a motor of the linear actuator, and is configured to move in an axial direction, the position of the rod being sensed as a relative position of the rod relative to a preset reference position;
a rotation angle sensing step of sensing, by a rotation sensor, a rotation angle of an output shaft of the motor for moving the rod; and a position calculating step of calculating, by a position calculating device having obtained a position sensing value of the position sensor and a rotation angle sensing value of the rotation sensor, a position of the rod of the linear actuator based on the position sensing value representing the relative position of the rod and the rotation angle sensing value representing the rotation angle of the output shaft of the motor.

8. A non-transitory computer-readable storage medium storing a position calculating program for causing a computer to perform:

a relative position obtaining process of obtaining a sensing value of a position sensor for sensing a position of a rod that is included in a linear actuator, is driven by a motor of the linear actuator, and is configured to move in an axial direction, the position of the rod being sensed as a relative position of the rod relative to a preset reference position;

a rotation angle obtaining process of obtaining a sensing value from a rotation sensor for sensing a rotation angle of an output shaft of the motor for moving the rod; and a position calculating process of calculating a position of the rod of the linear actuator based on a position sensing value of the position sensor representing the relative position of the rod and a rotation angle sensing value of the rotation sensor representing the rotation angle of the output shaft of the motor.

* * * * *